United States Patent

Sugiyama et al.

Patent Number: 5,643,124
Date of Patent: Jul. 1, 1997

[54] GEAR SHIFT CONTROL APPARATUS

[75] Inventors: Hideharu Sugiyama; Ikuo Hirose; Yoshifumi Fujita, all of Shizuoka, Japan

[73] Assignee: Jatco Corporation, Fuji, Japan

[21] Appl. No.: 560,589

[22] Filed: Nov. 20, 1995

[30] Foreign Application Priority Data

Nov. 30, 1994 [JP] Japan ................. 6-297025

[51] Int. Cl.$^6$ ................................. F16H 61/08
[52] U.S. Cl. ................................. 475/123
[58] Field of Search ................. 475/120, 123

[56] References Cited

U.S. PATENT DOCUMENTS 4,262,557  4/1981  Grob et al. ................. 475/120
5,289,741  3/1994  Debs et al. ................. 475/123

FOREIGN PATENT DOCUMENTS

6-11030  1/1994  Japan .

*Primary Examiner*—Dirk Wright
*Attorney, Agent, or Firm*—Foley & Lardner

[57] ABSTRACT

A gear shift control apparatus for use with an automatic transmission including a friction element operable on a hydraulic pressure applied thereto in an engaged and disengaged state. A gear ratio obtained in the automatic transmission is calculated based on transmission input and output shaft speeds. A reference gear ratio is set based on at least one of the transmission input and output shaft speeds. The hydraulic pressure is changed from a first level to a second level to change the friction element from the disengaged state to the engaged state so as to produce a change from a higher gear to a lower gear when the gear ratio reaches the reference gear ratio. The reference gear ratio increases as at least one of the transmission input and output shaft speeds increases. Alternatively, the reference gear ratio may be set at a smaller value as the rate of change of the gear ratio increases.

3 Claims, 9 Drawing Sheets

| GEAR RATIOS | FRICTION ELEMENTS | R/C | H/C | L/C | B/B | L&R/B | LOW O.W.C |
|---|---|---|---|---|---|---|---|
| R | | ○ | | | | ○ | |
| D RANGE | 1ST SPEED | | | ○ | | | ○ |
| | 2ND SPEED | | | ○ | ○ | | |
| | 3RD SPEED | | ○ | ○ | | | |
| | 4TH SPEED | | ○ | | ○ | | |
| ENGINE BRAKE | 1ST SPEED | | | ○ | | ○ | (○) |
| | 2ND SPEED | | | ○ | ○ | | |
| | 3RD SPEED | | ○ | ○ | | | |
| | 4TH SPEED | | ○ | | ○ | | |

○ = ENGAGED

FIG.4

| GEAR POSITIONS | SOLENOIDS | 1ST SHIFT SOLENOID | 2ND SHIFT SOLENOID |
|---|---|---|---|
| 1ST SPEED | | ON | ON |
| 2ND SPEED | | OFF | ON |
| 3RD SPEED | | OFF | OFF |
| 4TH SPEED | | ON | OFF |

GEAR SHIFT CONTROL APPARATUS

BACKGROUND OF THE INVENTION

This invention relates to a gear shift control apparatus for use with an automatic transmission having a friction element changeable into an engaged state to effect a change to a lower gear in response to a high level of hydraulic pressure applied thereto.

For example, Japanese Patent Kokai No. 6-11030 discloses a gear shift control apparatus arranged to monitor the gear ratio provided in an automatic transmission to effect a change from a higher gear to a lower gear. The automatic transmission includes a low clutch operable on a working fluid having a changeable pressure. When the gear ratio exceeds a reference value, the working fluid pressure is changed to its high level causing the low clutch to engage so as to produce a change from forth to third gear. It is proposed, in this Japanese Patent Kokai, to produce such a change down at an appropriate time regardless of the working fluid temperature by increasing the reference gear ratio value as the working fluid temperature increases.

The conventional gear shift control apparatus determines the reference gear ratio value at which the working fluid pressure is changed to its high level in dependent on the engine speed and the vehicle speed. Assuming now that the reference gear ratio value is set for a middle vehicle speed, the time at which the low clutch is engaged will be retarded when a change is effected from fourth to third gear at a low vehicle speed. In this case, the low clutch is engaged after completion of the change from fourth to third gear to provide a bad feel because of engine racing during the gear shift operation. On the other hand, the time at which the low clutch is engaged will be advanced when a change is effected from fourth to third gear at a high vehicle speed. In this case, the low clutch is engaged before completion of the change from fourth to third gear to produce shocks because of interlock during the gear shift operation.

SUMMARY OF THE INVENTION

It is a main object of the invention to provide an improved gear shift control apparatus which can start a change from a higher gear to a lower gear at an appropriate time regardless of vehicle speed.

There is provided, in accordance with the invention, a gear shift control apparatus for use in an automotive vehicle including an internal combustion engine and an automatic transmission having an input shaft, an output shaft and a friction element operable on a hydraulic pressure applied thereto in an engaged and disengaged state. The gear shift control apparatus comprises first sensor means sensitive to a speed of rotation of the transmission input shaft for producing a first sensor signal indicative of a sensed input shaft speed, and second sensor means sensitive to a speed of rotation of the transmission output shaft for producing a second sensor signal indicative of a sensed output shaft speed. The gear shift control apparatus also includes a control unit coupled to the first and second sensor means for changing the hydraulic pressure between first and second levels. The control unit includes means for calculating a gear ratio obtained in the automatic transmission based on the sensed input and output speeds, means for setting a reference gear ratio at a greater value as at least one of the sensed input shaft speed and the sensed output shaft speed increases, and means for changing the hydraulic pressure from the first level to the second level to change the friction element from the disengaged state to the engaged state so as to effect a change from a higher gear to a lower gear when the calculated gear ratio reaches the reference gear ratio.

In another aspect of the invention, there is provided a gear shift control apparatus for use in an automotive vehicle including an internal combustion engine and an automatic transmission having an input shaft, an output shaft and a friction element operable on a hydraulic pressure applied thereto in an engaged and disengaged state. The gear shift control apparatus comprises first sensor means sensitive to a speed of rotation of the transmission input shaft for producing a first sensor signal indicative of a sensed input shaft speed, and second sensor means sensitive to a speed of rotation of the transmission output shaft for producing a second sensor signal indicative of a sensed output shaft speed. The gear shift control apparatus also includes a control unit coupled to the first and second sensor means for changing the hydraulic pressure between first and second levels. The control unit includes means for calculating a gear ratio obtained in the automatic transmission based on the sensed input and output speeds, means for differentiating the calculated gear ratio to calculate a rate of change of the gear ratio, means for setting a reference gear ratio at a smaller value as the calculated rate of change of the gear ratio increases, and means for changing the hydraulic pressure from the first level to the second level to change the friction element from the disengaged state to the engaged state so as to effect a change from a higher gear to a lower gear when the calculated gear ratio reaches the reference gear ratio.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
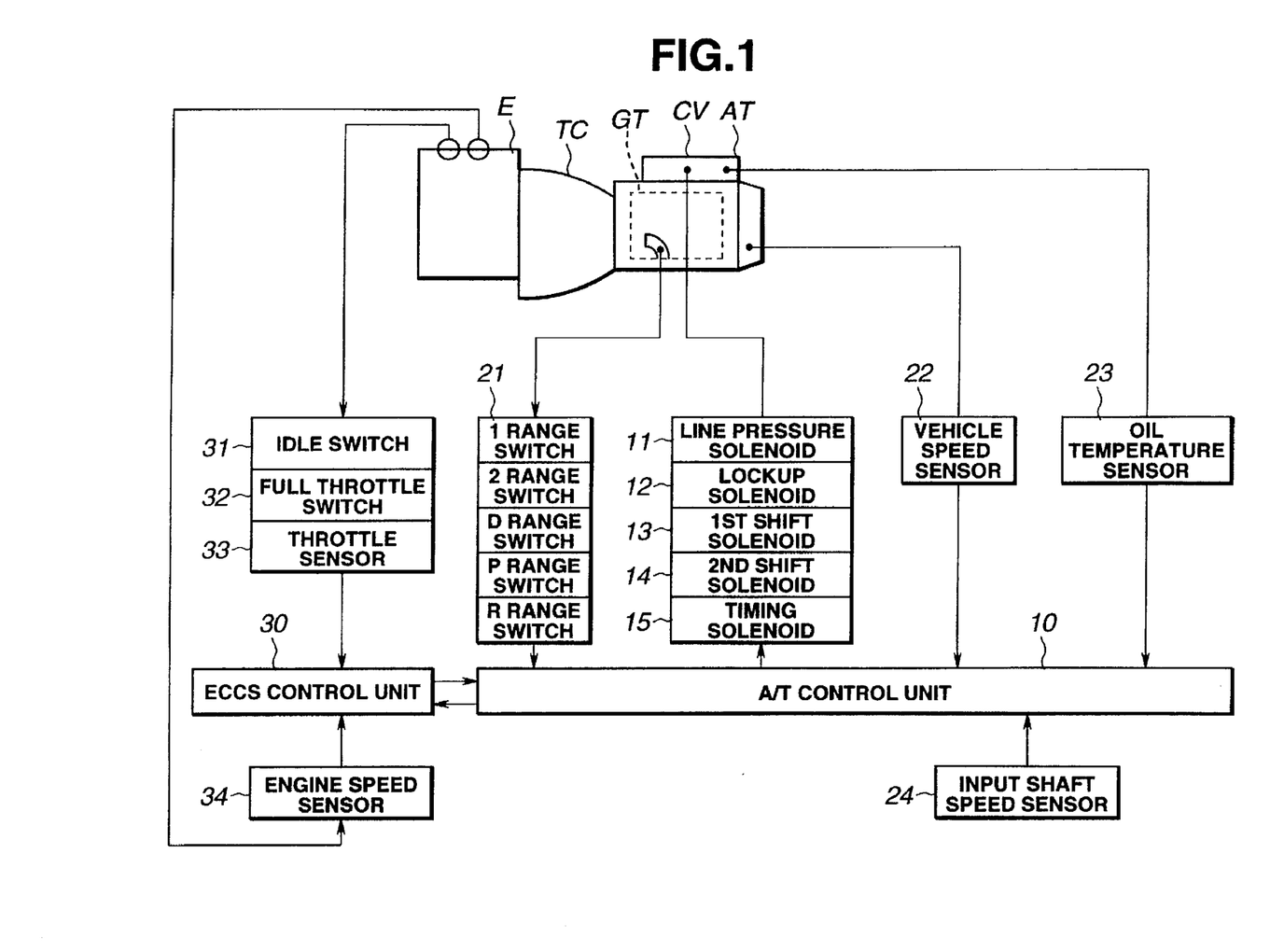
FIG. 1 is a schematic block diagram showing one embodiment of a gear shift control apparatus made in accordance with the invention.

With reference to the drawings and in particular to FIG. 1, there is shown a schematic block diagram of a gear shift control apparatus embodying the invention. The gear shift control apparatus is used with an automotive vehicle having an internal combustion engine E, and an automatic transmission AT having a torque converter TC provided with a lockup mechanism, a gear train GT to which a drive from the engine E is transmitted through the torque converter TC, and a control valve unit CV.

Figure 2:
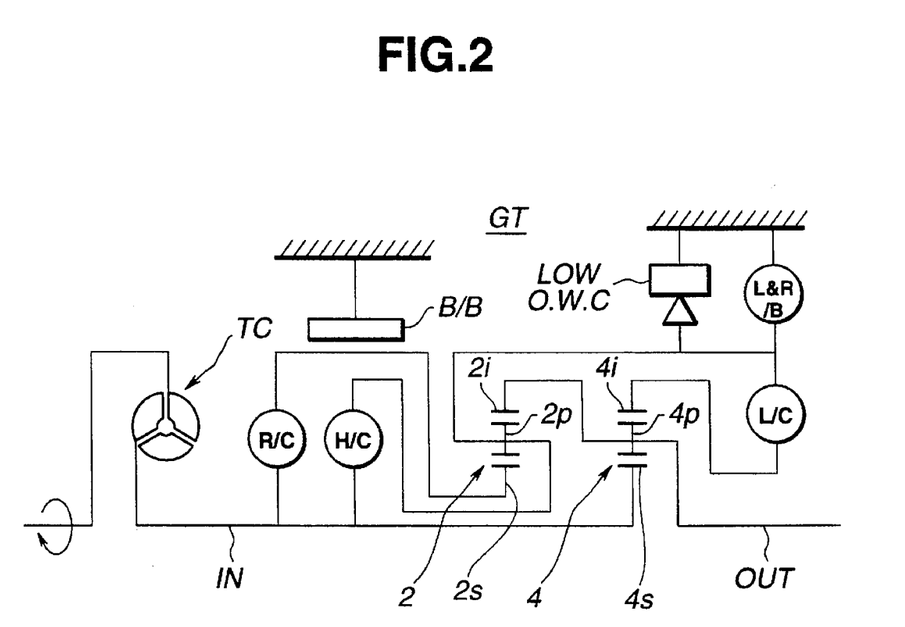
FIG. 2 is a schematic diagram showing a gear train included in the gear shift control apparatus of FIG. 1.
Figure 3:
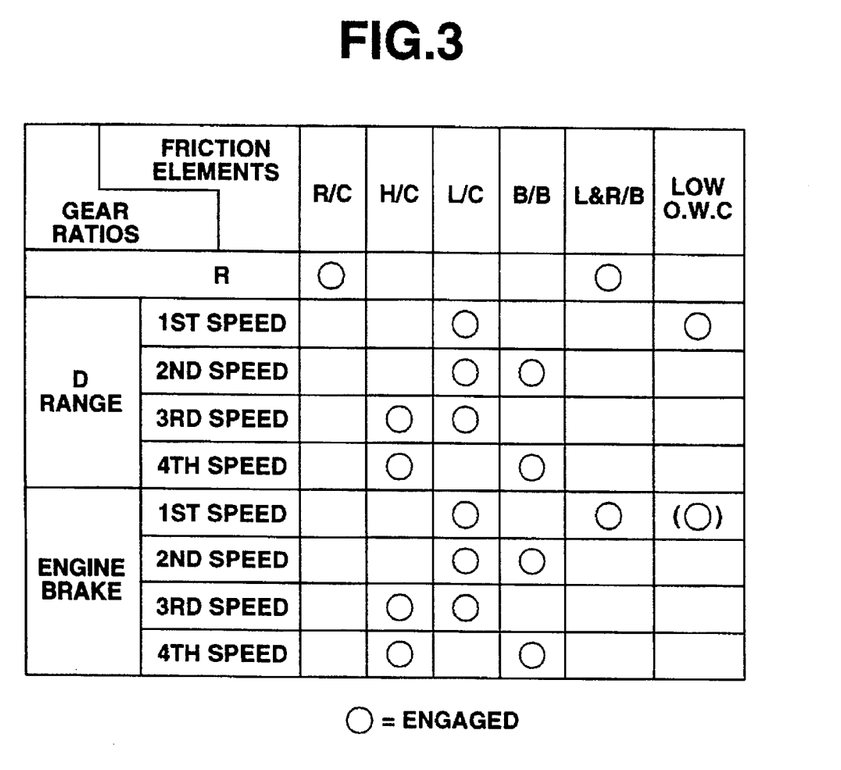
FIG. 3 is a table used in explaining the engaged and disengaged states of the friction elements illustrated in FIG. 2 to effect various speed ratio changes.

Referring to FIG. 2, the gear train GT includes front and rear planetary gear units 2 and 4 arranged in tandem with each other. The front planetary gear unit 2 has a front sun gear 2s, a front pinion gear 2p, a front internal gear 2i and a front carrier 2c. The rear planetary gear unit 4 has a rear planetary gear unit 4 comprised of a rear sun gear 4s, a rear pinion gear 4p, a rear internal gear 4i and a rear carrier 4c. The rear carrier 4c is coupled to the output shaft OUT. The gear train GT also has various friction elements including a reverse clutch R/C through which the front sun gear 2s is connected to the input shaft IN, a high clutch H/C through which the front carrier 2c is connected to the input shaft IN, a low clutch L/C through which the front carrier 2c is connected to the rear internal gear 4i, a band brake B/B for fixing the front sun gear 2s to the housing and a low and reverse brake L&R/B for fixing the front carrier 2c to a grounded or stationary member such as the transmission case. A one-way clutch Low/O.W.C is provided between the front carrier 2c and the housing. Each of the friction elements is switched between its engaged and disengaged states, as shown in FIG. 3, by a hydraulic fluid pressure supplied through the control valve unit CV. The one-way clutch Low/O.W.C is unlocked upon rotation of the front carrier 2c in a forward direction and it is locked upon rotation of the front carrier 2c in the reverse direction.

Returning to FIG. 1, an A/T control unit 10 is provided for controlling the automatic transmission AT. The A/T control unit 10 controls a line pressure solenoid 11, a lockup solenoid 12, a first shift solenoid 13, a second shift solenoid 14, and a timing solenoid 15 to make a gear change in the automatic transmission AT. The A/T control unit 10 effects gear changes based upon existing gear position, vehicle speed, oil temperature, and engine operating conditions. Thus, an inhibitor switch unit 21, a vehicle speed sensor 22, an oil temperature sensor 23 and an input shaft speed sensor 24 are connected to the A/T control unit 10. An idle switch 31, a full-throttle switch 32, a throttle sensor 33 and an engine speed sensor 34 are connected through a conventional ECCS control unit 30 to the A/T control unit 10. The inhibitor switch unit 21 is comprised of various automatic transmission gear position switches including a 1st range switch, a 2nd range switch, a D range switch, a P range switch and an R range switch for producing a signal indicative of the existing gear position of the automatic transmission AT. The vehicle speed sensor 22 is provided at a position for sensing the speed of rotation of the transmission output shaft. The oil temperature sensor 23 is provided for sensing the temperature of the lubrication oil. The input shaft speed sensor 24 is provided for sensing the speed of rotation of the transmission input shaft. The idle switch 31 is associated with the throttle valve situated for controlling the air flow to the engine and it produces a signal when the throttle valve is at its fully-closed position. The full-throttle switch 32 is associated with the throttle valve and it produces a signal when the throttle valve is at its fully-open position. The throttle sensor 33 is associated with the throttle valve and it produces a signal indicative of the degree of opening of the throttle valve. The engine speed sensor 34 is associated with the engine distributor and it produces a pulse signal of a repetitive rate proportional to the engine speed.

Figure 4:
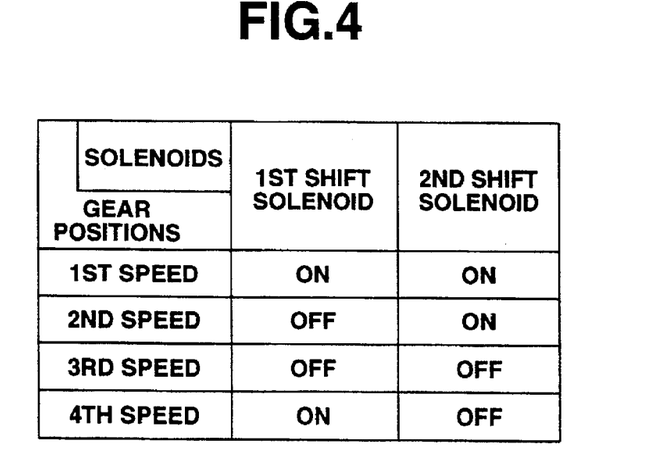
FIG. 4 is a table used in explaining the ON and OFF states of the first and second shift solenoids illustrated in FIG. 1 to effect various speed ratio changes.
Figure 5:
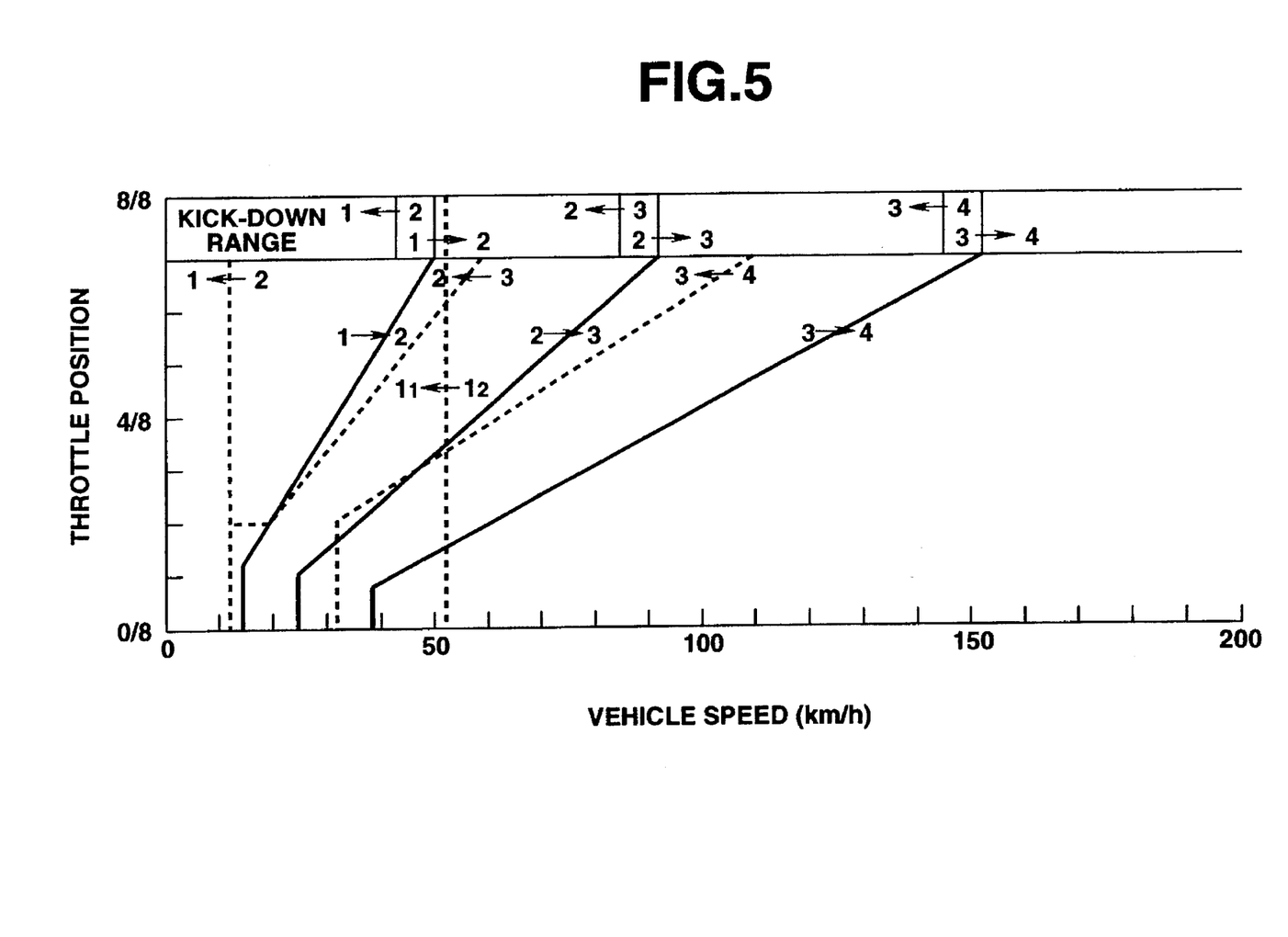
FIG. 5 is a diagram showing a shift schedule used in the gear shift control apparatus of FIG. 1.

In the illustrated embodiment, the A/T control unit 10 is arranged to effect gear changes by switching the ON and OFF states of the first and second shift solenoids 13 and 14, as shown in FIG. 4. For this purpose, the A/t control unit 10 employs a shift schedule table, as shown in FIG. 5, to produce a change-up command when the operation point represented by throttle valve position and vehicle speed crosses one of the change-up lines, as indicated by the solid lines of FIG. 5, and a change-down command when the operation point crosses one of the change-down lines, as indicated by the broken lines of FIG. 5. The line pressure solenoid 11 operates on a control signal having a variable pulse width or duty cycle fed from the A/T control unit 10 to provide an appropriate line pressure PL.

The A/T control unit 10 employs a digital computer which includes a center processing unit (CPU), a random access memory (RAM), a read only memory (ROM), and an input/output control unit (I/O). The central processing unit communicates with the rest of the computer via data bus. The input/output control unit includes an analog-to-digital converter which receives analog signals from the various sensors and it converts the received signal into corresponding digital signals for application to the central processing unit. The read only memory contains the programs for operating the central processing unit. The random access memory contains appropriate data in look-up tables (relationship) used for the operation of changing gear.

Figure 6:
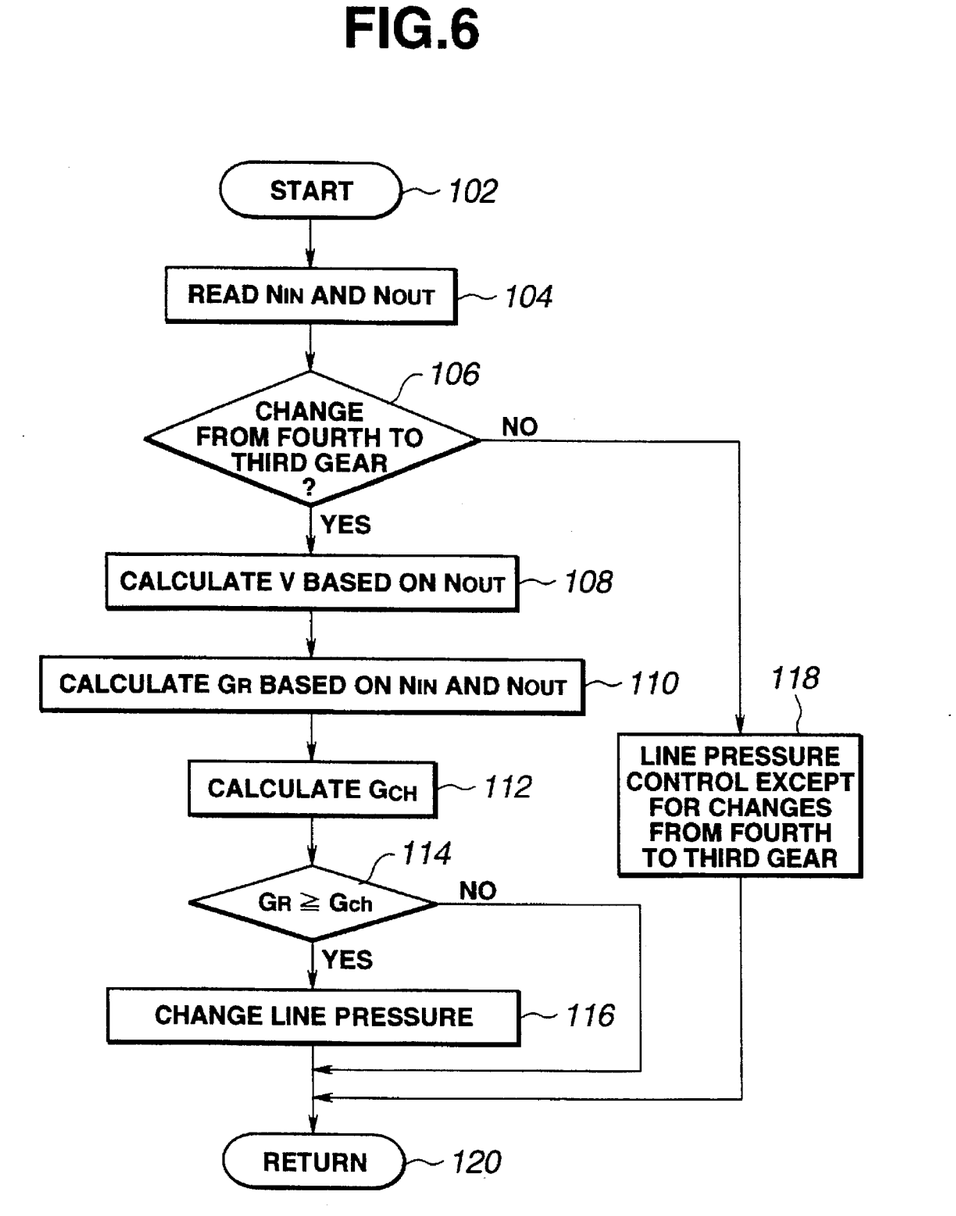
FIG. 6 is a flow diagram illustrating the programming of the digital computer as it is used for gear shift control.

FIG. 6 is a flow diagram illustrating the programming of the digital computer as it is used for line pressure control. The computer program is entered at the point 102. At the point 104 in the program, the transmission input and output shaft speeds $N_{IN}$ and $N_{OUT}$ are read into the computer program. The input shaft speed $N_{IN}$ is indicated by the signal fed from the input shaft speed sensor 24 and the output shaft speed $N_{OUT}$ is indicated by the signal fed from the vehicle speed sensor 22. At the point 106, a determination is made as to whether or not a change-down command is produced for the shift change from fourth to third gear. If the answer to this question is "yes", then the program proceeds to the point 108. Otherwise, the program proceeds to the point 118 where line pressure controls are effected except for the shift change from four to third gear. Following this, the program proceeds to the point 120 where the computer program is returned to the point 104.

Figure 7:
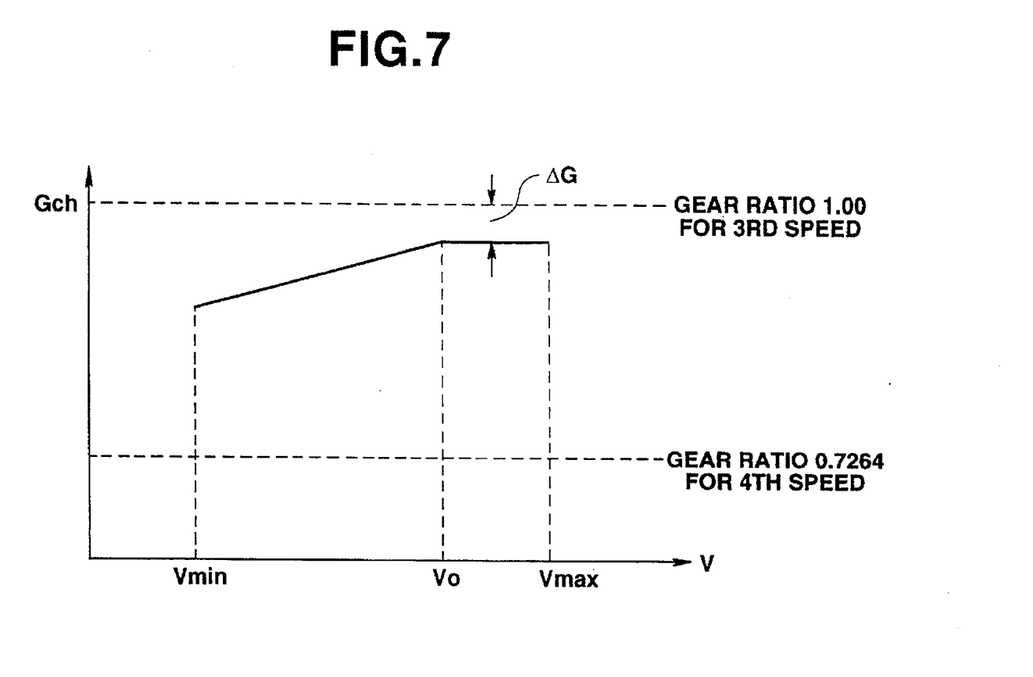
FIG. 7 is a graph of reference gear ratio $G_{ch}$ versus vehicle speed V.

At the point 108 in the program, the vehicle speed V is calculated based on the read output shaft speed $N_{OUT}$. At the point 110, the actual gear ratio $G_R$ is calculated based on the read input and output shaft speeds $N_{IN}$ and $N_{OUT}$ as $G_R = N_{IN}/N_{OUT}$. At the point 112, a reference gear ratio $G_{ch}$ is calculated from a relationship programmed into the computer. This relationship defines the reference gear ratio $G_{ch}$ as a function of vehicle speed V, as shown in FIG. 7. The characters Vmax and Vmin designate the upper and lower limits which define the vehicle speed range in which the change-down command is produced for the shift change from fourth to third gear. The reference gear ratio $G_{ch}$ increases as the vehicle speed V increases when the vehicle speed V is in the range of Vmin to Vo and it is fixed at its maximum value when the vehicle speed V is in the range of Vo to Vmax.

At the point 114 in the program, a determination is made as to whether or not the actual gear ratio $G_R$ is equal to or greater than the calculated reference gear ratio $G_{ch}$. If the answer to this question is "yes", then the program proceeds to the point 116 where a command is produced to change the line pressure PL from a low level to a high level to increase the pressure introduced into the low clutch L/C and then to the point 120. Otherwise, the program proceeds directly to the point 120.

Figure 8:
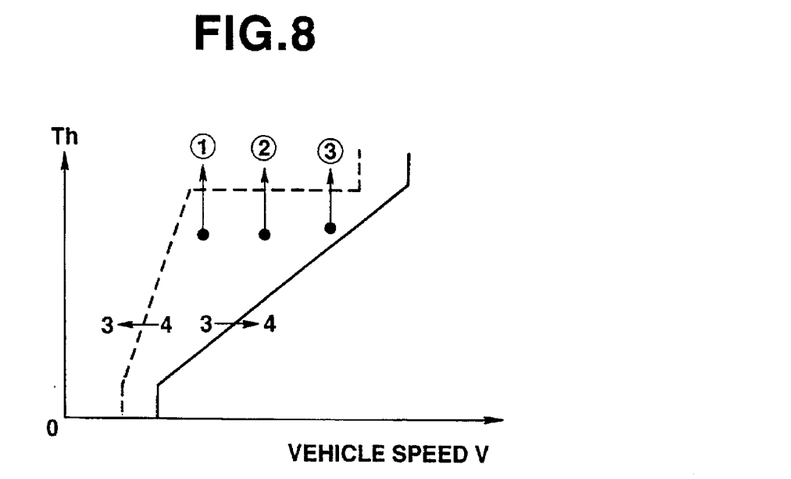
FIG. 8 is a diagram showing a shift schedule used for changes from fourth to third gear.

Description will be made to kick-down changes (1), (2) and (3) effected from fourth to third gear at low, middle and high vehicle speeds, as shown in FIG. 8. As described in connection with FIG. 7, the reference gear ratio $G_{ch}$ has small, middle and great values for the low, middle and high vehicle speeds, respectively. Fourth gear is given when the high clutch H/C is engaged and the band brake B/B is engaged.

Figure 9A:
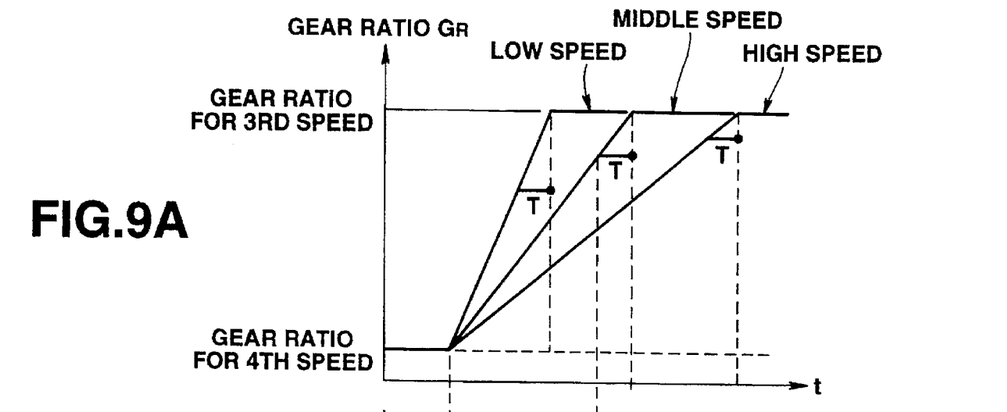
FIG. 9A is a graph showing changes in the gear ratio $G_R$ during a kick-down change from fourth to third gear.

When a kick-down change is effected at a low vehicle speed, as indicated by the arrow (1) of FIG. 8, the reference gear change $G_{ch}$ is set at a small value. For this reason, the actual gear ratio $G_R$ will reach the reference gear change $G_R$ and thus the command is produced to increase the line pressure PL in a short time after the change-down command is produced for the shift change from fourth to third gear. Assuming now that the time T required to engage the low clutch L/C from the time at which the line pressure PL is changed to a high level is constant, as shown in FIG. 9A, the timing of production of the command to increase the line pressure PL is advanced. This is effective to prevent the engine from racing at low vehicle speeds where the time rate of change of the gear ratio is great.

Figure 9B:
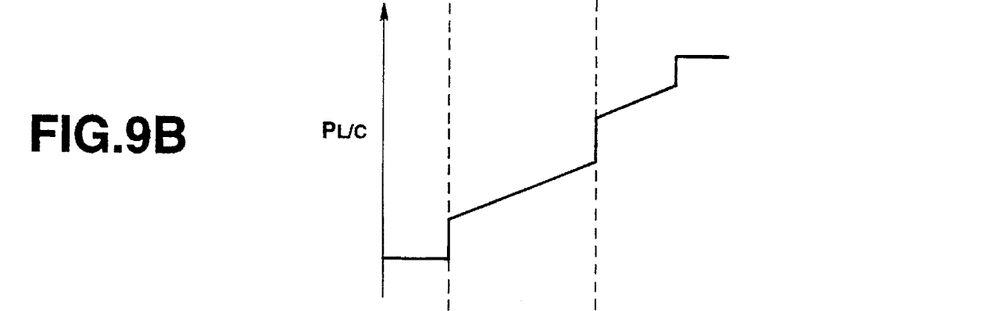
FIG. 9B is a graph showing changes in the hydraulic pressure $P_{L/C}$ applied to the low clutch during a kick-down change from fourth to third gear.
Figure 9C:
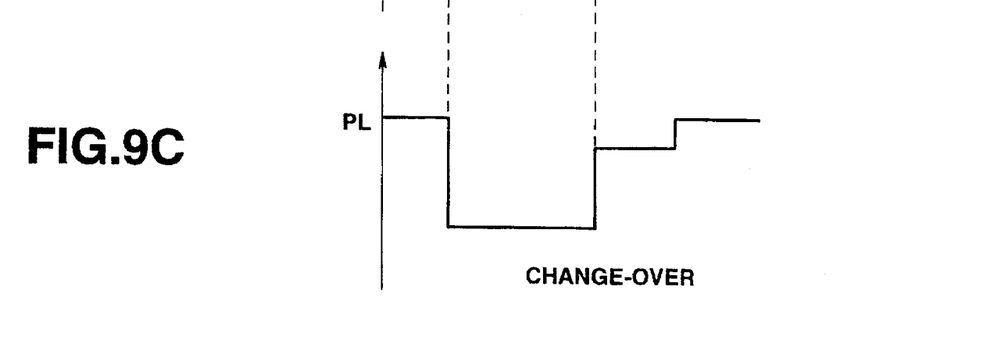
FIG. 9C is a graph showing changes in the line pressure PL during a kick-down change from fourth to third gear.

When a kick-down change is effected at a middle vehicle speed, as indicated by the arrow (2) of FIG. 8, the reference gear change $G_{ch}$ is set at a middle value. For this reason, the actual gear ratio $G_R$ will reach the reference gear change $G_R$ and thus the command is produced to increase the line pressure PL in an appropriate time after the change-down command is produced for the shift change from fourth to third gear. Assuming now that the time T required to engage the low clutch L/C from the time at which the line pressure PL is changed to a high level is constant, as shown in FIG. 9A, the timing of production of the command to increase the line pressure PL is appropriate. FIG. 9B shows changes in the pressure $P_{L/C}$ introduced into the low clutch L/C and FIG. 9C shows changes in the line pressure PL. As can be seen from FIGS. 9A, 9B and 9C, the time at which the low clutch L/C is engaged, that is, the time T plus the time at which the command is produced to increase the line pressure PL, agrees well with the time at which third gear is given. This is effective to provide a good gear change feel with no engine racing and no shock.

When a kick-down change is effected at a high vehicle speed, as indicated by the arrow (3) of FIG. 8, the reference gear change $G_{ch}$ is set at a great value. For this reason, the actual gear ratio $G_R$ will reach the reference gear change $G_R$ and thus the command is produced to increase the line pressure PL in a long time after the change-down command is produced for the shift change from fourth to third gear. Assuming now that the time T required to engage the low clutch L/C from the time at which the line pressure PL is changed to a high level is constant, as shown in FIG. 9A, the timing of production of the command to increase the line pressure PL is retarded. This is effective to prevent shocks caused from interlock.

When a kick-down change is effected at a vehicle speed ranging from Vo to Vmax, the reference gear change $G_{ch}$ is set at a constant value regardless of the vehicle speed V in a manner to leave a margin ΔG with respect to the gear ratio for the third gear, as shown in FIG. 7. This is effective to ensure the time T required to engage the low clutch L/C after the command is produced to increase the line pressure PL at high vehicle speeds V exceeding Vo.

While the reference gear ratio is calculated as a function of vehicle speed, it is to be understood that the reference gear ratio may be calculated as a function of at least one of speed related parameters including transmission input shaft speed, engine speed and the like which determines the rate of change of the gear ratio during a change to a lower gear.

Figure 10:
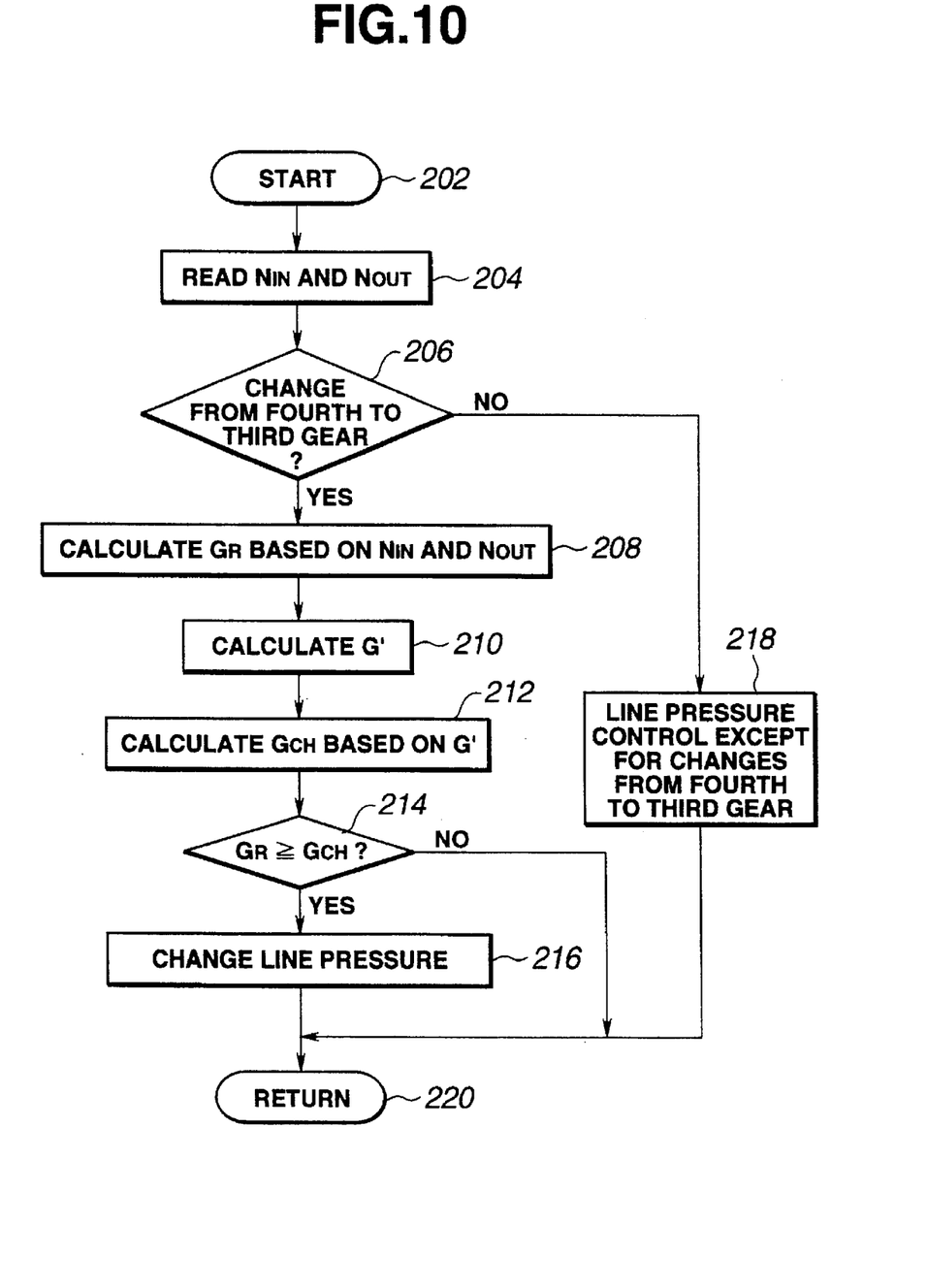
FIG. 10 is a flow diagram illustrating a modified form of the programming of the digital computer as it is used for gear shift control.

FIG. 10 is a flow diagram illustrating a modified form of the programming of the digital computer as it is used for line pressure control. The computer program is entered at the point 202. At the point 204 in the program, the transmission input and output shaft speeds $N_{IN}$ and $N_{OUT}$ are read into the computer program. The input shaft speed $N_{IN}$ is indicated by the signal fed from the input shaft speed sensor 24 and the output shaft speed $N_{OUT}$ is indicated by the signal fed from the vehicle speed sensor 22. At the point 206, a determination is made as to whether or not a change-down command is produced for the shift change from fourth to third gear. If the answer to this question is "yes", then the program proceeds to the point 208. Otherwise, the program proceeds to the point 218 where line pressure controls are effected except for the shift change from four to third gear. Following this, the program proceeds to the point 220 where the computer program is returned to the point 204.

Figure 11:
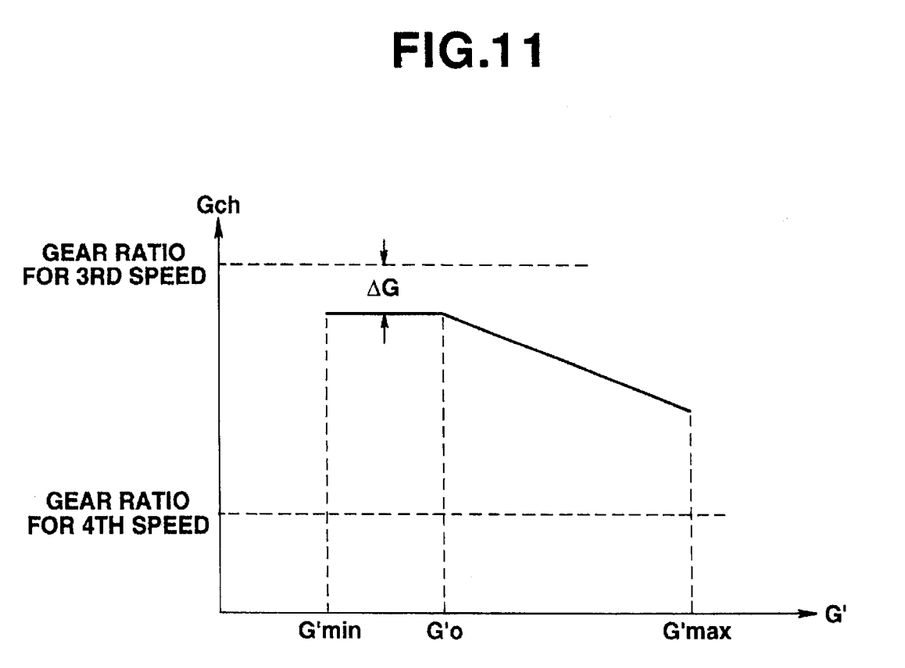
FIG. 11 is a graph of reference gear ratio $G_{ch}$ versus gear ratio changing rate G'.

At the point 208 in the program, the actual gear ratio $G_R$ is calculated based on the read input and output shaft speeds $N_{IN}$ and $N_{OUT}$ as $G_R = N_{IN}/N_{OUT}$. At the point 210, the central processing unit calculates the rate G' of change of the gear ratio $G_R$ by differentiating the calculated actual gear ratio $G_R$. At the point 212, a reference gear ratio $G_{ch}$ is calculated from a relationship programmed into the computer. This relationship specifies the reference gear ratio $G_{ch}$ as a function of gear ratio changing rate G', as shown in FIG. 11. The characters G'max and G'min designate the upper and lower limits which define the gear ratio changing rate range in which the change-down command is produced for the shift change from fourth to third gear. The reference gear ratio $G_{ch}$ is fixed at its maximum value when the gear ratio changing rate G' is in the range of G'min to G'0. The reference gear ratio $G_{ch}$ decreases as the gear ratio changing rate G' increases when the gear ratio changing rate G' is in the range of G'0 to G'max.

At the point 214 in the program, a determination is made as to whether or not the actual gear ratio $G_R$ is equal to or greater than the calculated reference gear ratio $G_{ch}$. If the answer to this question is "yes", then the program proceeds to the point 216 where a command is produced to change the line pressure PL from a low level to a high level to increase the pressure introduced into the low clutch L/C and then to the point 220. Otherwise, the program proceeds directly to the point 220.

Description will be made to kick-down changes effected from fourth to third gear at low, middle and high vehicle speeds. As described in connection with FIG. 11, the reference gear ratio $G_{ch}$ has a small value when the gear ratio changing rate G' has a great value at a low vehicle speed, a middle value when the gear ratio changing rate G' has a middle value at a middle vehicle speed, and a great value when the gear ratio changing rate G' has a small value at a high vehicle speed. Fourth gear is given when the high clutch H/C is engaged and the band brake B/B is engaged, and third gear is given when the band brake B/B is released and the low clutch L/C is engaged.

When a kick-down change is effected at a low vehicle speed with a great rate G' of change of the gear ratio, the reference gear change $G_{ch}$ is set at a small value. For this reason, the time at which the control starts to increase the line pressure PL so as to increase the pressure introduced into the low clutch L/C is advanced. It is, therefore, possible to start the control of increasing the line pressure PL so as to increase the pressure to the low clutch L/C at an appropriate timing at low vehicle speeds where the range where the engine speed changes before and after the change from fourth to third gear is small and the time required for the operation of changing gear is short. This is effective to prevent the engine from racing.

When a kick-down change is effected at a high vehicle speed with a small rate G' of change of the gear ratio, the reference gear change $G_{ch}$ is set at a great value. For this reason, the time at which the control starts to increase the line pressure PL so as to increase the pressure introduced into the low clutch L/C is retarded. It is, therefore, possible to start the control of increasing the line pressure PL so as to increase the pressure to the low clutch L/C at an appropriate timing at high vehicle speeds where the range where the engine speed changes before and after the change from fourth to third gear is great and the time required for the operation of changing gear is long. This is effective to prevent shocks caused from interlock.

When a kick-down change is effected at a gear ratio changing rate G' ranging from G'min to G'0, the reference gear change $G_{ch}$ is set at a constant value regardless of the gear ratio changing rate G' in a manner to leave a margin ΔG with respect to the gear ratio for the third gear, as shown in FIG. 11. This is effective to ensure the time T required to engage the low clutch L/C after the command is produced to increase the line pressure PL at a small gear ratio changing rate below G'0.

While the invention has been described in connection with a control unit arranged to control the pressure introduced into the low clutch by changing the line pressure in a manner to control the accumulator back pressure, it is to be understood, of course, that the control unit may be arranged to control a solenoid valve through which the low clutch is supplied with pressure. While the invention has been described in conjunction with specific embodiments thereof, it is evident that many alternatives, modifications and variations will be apparent to those skilled in the art. Accordingly, it is intended to embrace all alternatives, modifications and variations that fall within the scope of the appended claims.

What is claimed is:

1. A gear shift control apparatus for use in an automotive vehicle including an internal combustion engine and an automatic transmission having an input shaft, an output shaft and a friction element operable on a hydraulic pressure applied thereto in an engaged and disengaged state, the apparatus comprising:

first sensor means sensitive to a speed of rotation of the transmission input shaft for producing a first sensor signal indicative of a sensed input shaft speed;

second sensor means sensitive to a speed of rotation of the transmission output shaft for producing a second sensor signal indicative of a sensed output shaft speed; and a control unit coupled to the first and second sensor means for changing the hydraulic pressure between first and second levels, the control unit including means for calculating a gear ratio obtained in the automatic transmission based on the sensed input and output speeds, means for setting a reference gear ratio at a greater value as at least one of the sensed input shaft speed and the sensed output shaft speed increases, and means for changing the hydraulic pressure from the first level to the second level to change the friction element from the disengaged state to the engaged state so as to effect a change from a higher gear to a lower gear when the calculated gear ratio reaches the reference gear ratio.

2. The gear shift control apparatus as claimed in claim 1, further including third sensor means sensitive to a speed of rotation of the engine for producing a third sensor signal indicative of a sensed engine speed, and wherein the control unit includes means for setting the greater reference gear ratio at a greater value as at least one of the sensed input shaft speed, the sensed output shaft speed and the sensed engine speed increases.

3. A gear shift control apparatus for use in an automotive vehicle including an internal combustion engine and an automatic transmission having an input shaft, an output shaft and a friction element operable on a hydraulic pressure applied thereto in an engaged and disengaged state, the apparatus comprising:

first sensor means sensitive to a speed of rotation of the transmission input shaft for producing a first sensor signal indicative of a sensed input shaft speed;

second sensor means sensitive to a speed of rotation of the transmission output shaft for producing a second sensor signal indicative of a sensed output shaft speed;

a control unit coupled to the first and second sensor means for changing the hydraulic pressure between first and second levels, the control unit including means for calculating a gear ratio obtained in the automatic transmission based on the sensed input and output speeds, means for differentiating the calculated gear ratio to calculate a rate of change of the gear ratio, means for setting a reference gear ratio at a smaller value as the calculated rate of change of the gear ratio increases, and means for changing the hydraulic pressure from the first level to the second level to change the friction element from the disengaged state to the engaged state so as to effect a change from a higher gear to a lower gear when the calculated gear ratio reaches the reference gear ratio.

* * * * *